No. 862,146. PATENTED AUG. 6, 1907.
J. S. EDSTRÖM.
ELECTRICALLY HEATED SHAFT FURNACE.
APPLICATION FILED MAR. 30, 1906.
2 SHEETS—SHEET 1.
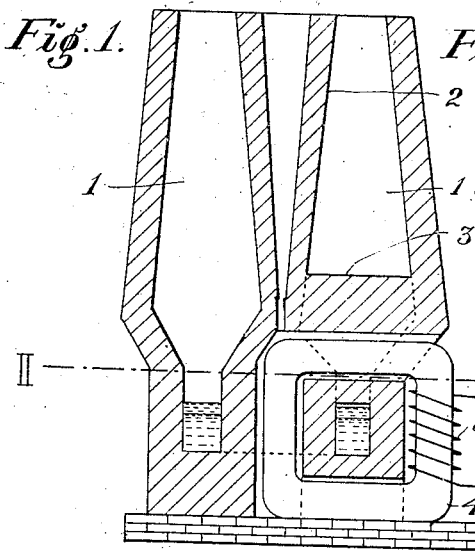
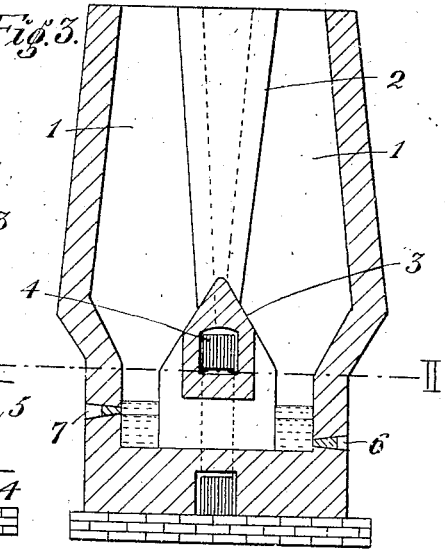
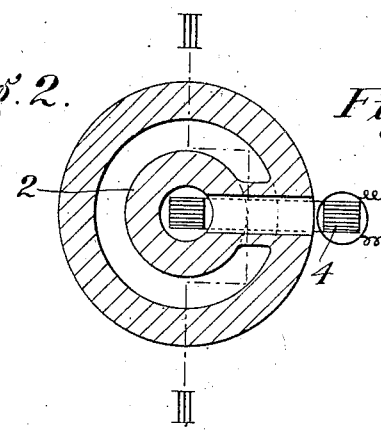
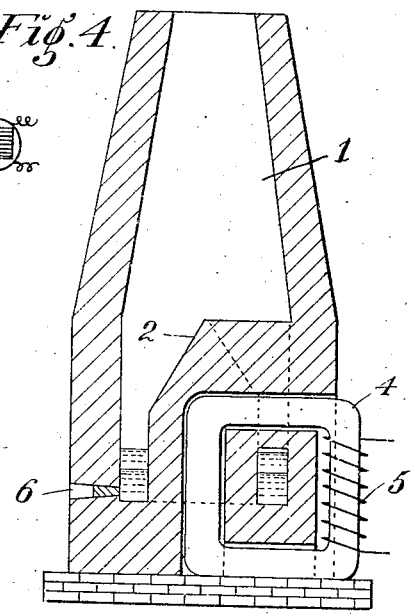
Witnesses
Inventor
Johannes S. Edström

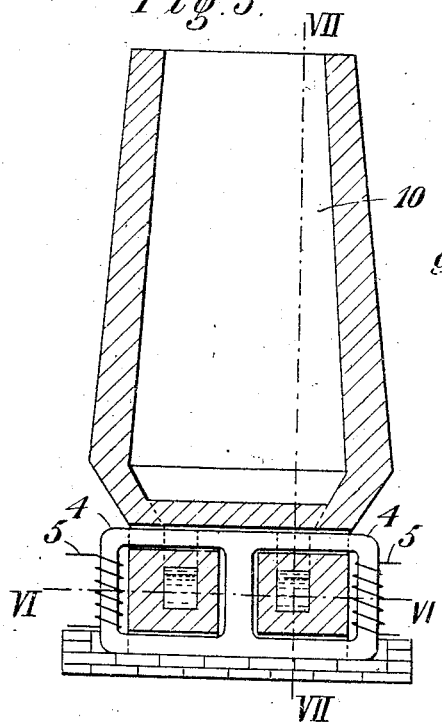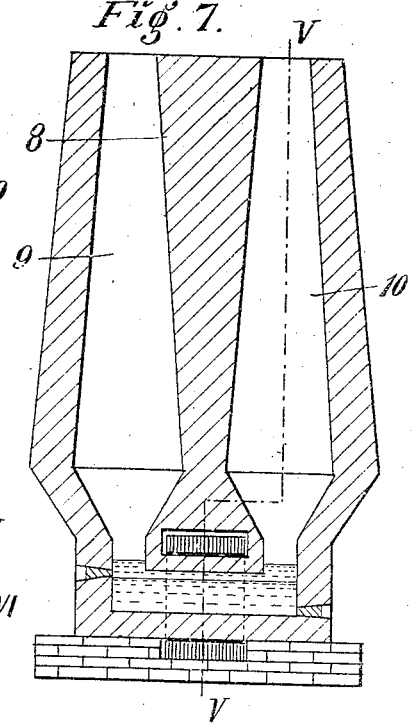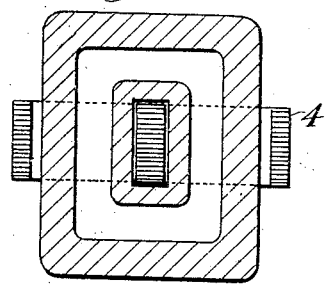

UNITED STATES PATENT OFFICE.

JOHANNES SIGFRID EDSTRÖM, OF VESTERAS, SWEDEN.

ELECTRICALLY-HEATED SHAFT-FURNACE.

No. 862,146.   Specification of Letters Patent.   Patented Aug. 6, 1907.

Application filed March 30, 1906. Serial No. 308,973.

*To all whom it may concern:*

Be it known that I, JOHANNES SIGFRID EDSTRÖM, a subject of the King of Sweden, and a resident of Vesterås, Sweden, have invented a new and useful Improvement in Electrically-Heated Shaft-Furnaces, of which the following is a specification, reference being had to the drawings accompanying and forming a part hereof.

This invention relates to improvements in electrically heated shaft-furnaces.

In the usual blast-furnace-processes it is as well known necessary to keep the addition of fuel so large in relation to the ore that the fuel will be sufficient for the reduction of the ore as well as for the melting of the reduced metal. The heat created by the combustion of the fuel is, however, not so high that the reduced iron is obtained in a pure condition but it is necessary for the melting that the iron absorb a comparatively large quantity of carbon so that it will be transferred into raw iron and thus having its melting point lowered. It has been proposed for direct production of malleable iron from ore to introduce electric energy into the lower part of the blast-furnace in order to produce the increase of heat necessary for melting the reduced iron without the iron absorbing so much carbon as to form pig iron and in order simultaneously to obtain a refining of the metal by keeping the melted metal at a high temperature by the influence of the electric energy introduced into the furnace.

The present invention relates to a furnace construction, in which the introduction of the electric energy will take place in a very satisfactory manner and to such an extent that the temperature necessary for performing the process will be obtained. The invention is based on the introduction of the electric energy by inducing the melted mass by means of an alternating magnetic field. The whole melted mass of metal is uniformly induced, whereby the melted metal will be uniformly heated and the obtaining of a uniform and homogenous product will be secured. This is rendered possible by a special construction of the furnace, the same according to the present invention being carried out in such manner that the hearth of the same forms an annular chamber of uniform or substantially uniform cross-section and is arranged as induced member of an electric transformer or generator, the iron-core of which passes through the said hearth. By this means it is possible to induce in the hearth-material itself, if the same be of electrically conducting material, or in the melted mass a secondary current which heats the melting bath to the temperature required for the performance of the process aimed at.

Since the whole upper surface of the melting bath or a considerable part thereof is not covered, it is obvious that the heat radiating therefrom will pre-heat the overlying not melted parts of the charge and thus accelerate the melting of the reduced metal, before the latter has absorbed any larger quantity of carbon, as well as the reduction of the metal.

The present device is applicable to blast-furnaces in which the essential part of the heat is produced by the combustion of an excess of fuel by means of a blast as well as in other shaft-furnaces of arbitrary construction with or without blast in which the heat introduced electrically plays the most essential part. In furnaces of the last mentioned kind the charging in the treatment of ore may suitably be accomplished in such manner that the quantity of fuel corresponds exactly to that required for the reduction, whereby the electric heat developed in the melting hearth spreads itself upwardly and is utilized for the reduction as well as for the melting of the reduced metal. The gases flowing off, which in this case consist substantially of oxid of carbon, may in wellknown manner be burned in the parts of the shaft above the zone of reduction by the supply of blast-air for preliminary heating of the charge, or they may be accumulated and utilized for other purposes.

For practical reasons it is suitable to make the inner parts of the hearth of an electrically conducting material, so that the same form a crucible or a closed circuit around the melted metal and are likewise induced by the magnetic lines of force flowing through the central part of the hearth, whereby a further increase of heat may be obtained.

In the accompanying drawings I have illustrated some embodiments of my invention.

Figure 1 shows a vertical section of a blast-furnace constructed in accordance with my present invention. Fig. 2 is a horizontal section on line II—II in Fig. 1. Fig. 3 is a vertical section line III—III in Fig. 2. Fig. 4 shows a vertical section of a second form of a blast-furnace. Fig. 5 shows a vertical section of a third form of a blast-furnace having a transformer-device embodying my invention. Fig. 6 is a horizontal section on line VI—VI in Fig. 5. Fig. 7 is a vertical section at right angles to that shown in Fig. 5. The section shown in Fig. 5 is taken on line V—V in Fig. 7, and the section shown in Fig. 7 is taken on line VII—VII in Fig. 5.

In the form shown in Figs. 1-3 the shaft 1 is annular along the whole height of the furnace, a central core 2 being arranged in the same. At the lower end the said core is hollow, and at some distance above the bottom is arranged a likewise hollow vault 3 between the said core and the wall of the furnace. Underneath the said vault and in the bottom of the furnace is provided a channel which is in communication with the lower end of the channel in the said central core. In the U-shaped channel thus formed, which is heat-insulated from the furnace chamber by the masonry, is inserted an iron-core 4 of a suitable construction, and the said core is provided with a primary winding 5 which is supplied with alternating current of suitable frequency and may be provided on the outer part of the iron-core, as is shown, or on any other or eventually all of the sides of the core. As will be easily understood the hearth of the furnace here forms a closed circuit around the central part of the core, so that the melted metal accumulated in the hearth will constitute the secondary member of a transformer, the other parts of which are constituted by the iron-core 4 and the primary winding 5. The hearth is provided with an outlet 6 for the metal and an outlet 7 for the slag in the usual manner, the outlet 6 being preferably provided at a distance above the bottom of the hearth in order that on the said bottom may after each draft always remain a closed conductor of a cross-section that is suitable for taking up the electric energy. If the furnace is to be used while simultaneously supplying a blast it may be provided with twyers of the usual arrangement. The charge is introduced at the top as is usual in shaft-furnaces and the working is continuous. When a sufficient quantity of melted metal has been accumulated in the hearth, the metal is drawn and it is obvious that on account of the comparatively long time between the drafts, during which the melted metal is kept at a high temperature, the metal is exposed to an effective refining, so that a product of high quality will be obtained from a suitable charge.

The form shown in Fig. 4 differs from that illustrated in Figs. 1-3 chiefly in that the central core 2 is provided only in the lower part of the shaft. The transformer-device is the same as that described above.

The form shown in Figs. 5-7 differs from those described above in that the hearth as well as the shaft is of rectangular horizontal section and that the transformer has a double iron-core for obtaining a symmetrical arrangement. Further the shaft is divided in two like parts 9 and 10 separated from each other only at the bottom by means of the rectangular hearth forming an annular chamber. The part of the intermediate wall 8 at the widest part of the shaft may be dispensed with, if desired.

As will be easily understood, the invention is applicable to any shaft-construction, provided the lower part of the latter forms an annular chamber which enables the melted metal accumulated therein, or the hearth-material itself, to be induced by means of one or more magnetic circuits passing through the hearth.

In order to prevent the iron-core from being excessively heated the core may in all forms of my invention be cooled by means of air, water or any other suitable fluid circulating in or around the core. When a central core of masonry extending along the whole height of the shaft is used, the said core may, preferably, be made hollow, as is shown as an example in Fig. 1, in order to obtain a ventilation channel from the chamber inclosing the iron-core, the said channel working as a chimney and being capable of drawing in a quantity of cold air sufficient for cooling the iron-core, whereby mechanical arrangements for the same purpose eventually will be dispensable.

Obviously the use of the furnaces embodying my present invention is not limited to the reduction of iron-ore. For instance, they may advantageously be used for continually melting and refining of pig-iron, to which is added langrage, or ore, or of other mixtures for producing malleable iron or steel of high quality. They may further be used for the reduction of oxides of metal of all kinds, where the metal in the reduction is obtained in liquid condition, also aluminium, the excess of heat obtained electrically rendering it possible to obtain any desired temperature necessary for the performance of metallurgic processes. The invention may also be used in zinc-shaft-furnaces, if, for instance an arbitrary closed conductor, which is not injured or volatilized at the temperatures used, be provided in the bottom of the furnace for taking up the electrically produced heat. Finally it may be understood that in one and the same shaft-furnace two or more annular chambers in which the melted material forms closed circuits may be used.

Having now described my invention what I claim as new and desire to secure by Letters Patent is:

1. In an electric furnace the combination, of a shaft, a hearth forming an annular horizontal chamber of uniform or substantially uniform cross-section for taking up the melted material and placed directly beneath the shaft, and an iron-core for inducing electric currents in the same melted material, substantially as and for the purpose set forth.

2. In an electric furnace the combination, of a shaft, a hearth forming an annular horizontal chamber of substantially uniform cross-section and placed directly beneath the shaft, a hollow core of fire-proof material in the said hearth, an iron-core in the firstmentioned core, and a primary winding on the said iron-core, substantially as and for the purpose set forth.

3. In an electric furnace the combination, of a shaft, a hearth forming an annular horizontal chamber of substantially uniform cross-section and placed directly beneath the shaft, a central hollow core of fire-proof material in the said hearth, a hollow extension on the said core extending upwardly through the shaft, an iron-core in the first-mentioned core, and a primary winding on the said iron-core, substantially as and for the purpose set forth.

In testimony whereof I have signed my name to this specification in the presence of two subscribing witnesses.

JOHANNES SIGFRID EDSTRÖM.

Witnesses:
  HJ. FETTERSTRÖM,
  B. G. HOLM.